United States Patent Office 3,452,119
Patented June 24, 1969

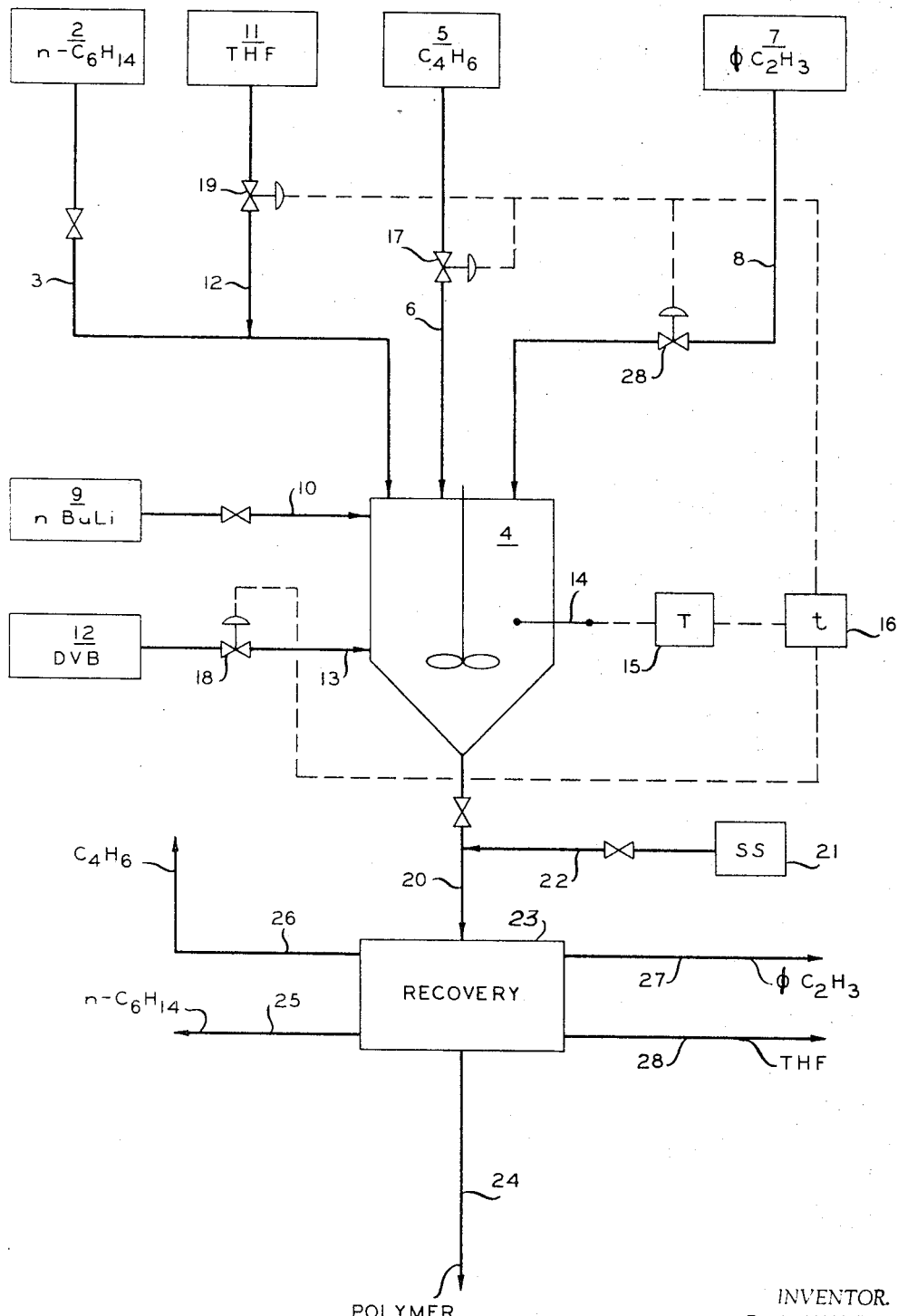

3,452,119
PROCESS CONTROL IN PRODUCTION OF COPOLYMERS
Robert A. Hinton, Bartlesville, Okla., assignor to Phillips Petroleum Company, a corporation of Delaware
Filed June 29, 1964, Ser. No. 378,923
Int. Cl. C08d 1/14, 3/02; C08f 1/56
U.S. Cl. 260—880                    7 Claims

ABSTRACT OF THE DISCLOSURE

A process for making block copolymers of alkadienes and vinyl aromatic hydrocarbons is automatically controlled by polymerizing at least one of the monomers in a first stage adiabatically and thereafter polymerizing at least one of the monomers in a second stage, said second stage being begun when the temperature rise in the first stage reaches a predetermined value.

---

This invention relates to the production of copolymers of conjugated dienes. In one aspect it relates to a process and apparatus for controlling the production of block copolymers. In still another aspect it relates to a method and apparatus for controlling the addition of comonomers in a copolymerization process.

The production of homopolymers and copolymers of conjugated alkadienes in the presence of organolithium catalysts is known in the art. For example, United States Patent 2,975,160 (1961), discloses that random copolymers of alkadienes, such as 1,3-butadiene, and comonomers, such as styrene, can be produced by copolymerization in the presence of organolithium catalysts and a diluent, comprising a major proportion of a hydrocarbon and a minor proportion of a randomizing agent, the latter being a polar compound, usually selected from the group consisting of ethers, thioethers, and tertiary amines.

Copending application Ser. No. 300,051, filed Aug. 5, 1963, by R. P. Zelinski, discloses the production of block copolymers in which one block or molecular segment is a homopolymer, or a copolymer in which only a few copolymeric units are present, and another segment is a copolymer having a molecular structure characteristic of the random copolymers described in the patent hereinbefore cited. In accordance with application Ser. No. 300,051, a block copolymer can be produced in two stages, one of which involves random copolymerization in the presence of a randomizing agent and an organolithium catalyst as disclosed in the cited patent, and the other stage of which is the production of a homopolymer block. The copolymer is generally produced from a conjugated alkadiene, usually having from 4 to 6 carbon atoms per melocule and a vinyl aromatic hydrocarbon having from 8 to 20 carbon atoms per molecule. On account of commercial availability, the most frequently used comonomers are 1,3-butadiene, or isoprene, and styrene.

An object of this invention is to provide an improved process for the production of block copolymers. Another object of the invention is to effect improved process control in a copolymerization process. A further object of the invention is to effect controlled order of addition of comonomers in a copolymerization process. Other objects and advantages will become apparent to those skilled in the art upon consideration of this disclosure.

The accompanying drawing is a schematic flow diagram illustrating one embodiment of my invention.

According to this invention, there is provided, in a process wherein an alkadiene is copolymerized with a vinyl aromatic hydrocarbon in one stage and one of said alkadiene and said vinyl aromatic hydrocarbon is polymerized in another stage, thus forming a blocking copolymer, the improvement which comprises conducting the first-mentioned stage adiabetically, measuring the temperature rise during said stage and beginning the other stage after said temperature rise has reached a predetermined value.

In one of its forms, my invention comprises, in a process for producing a block copolymer by copolymerizing 1,3-butadiene with styrene in a first stage to form a copolymer block and homopolymerizing 1,3-butadiene in a second stage to form a homopolymer block, the improvement of conducting said first stage adiabatically, producing a signal proportional to the temperature or temperature increase in said first stage and beginning said second stage in response to the attainment, by said signal, of a predetermined magnitude.

In another embodiment of the invention, the homopolymerization of the alkadiene can proceed in the first stage and the copolymerization of the alkadiene with the vinyl aromatic hydrocarbon can be effected in the second stage which is begun when the temperature or temperature increase in the first stage reaches a predetermined value.

In still another embodiment of the invention, all of the alkadiene and the vinyl aromatic hydrocarbon can be charged to a batch reactor and the reaction begun. The alkadiene polymerizes more rapidly than the vinyl aromatic in the presence of the organolithium catalyst so that the first polymer segment formed is made up chiefly of alkadiene units with no more than a very small number of vinyl aromatic comonomer units. After the temperature or temperature increase in the reactor has attained a certain value, indicating a desired extent of polymerization of the alkadiene, the randomizing agent is added in response to the attainment of the predetermined temperature or temperature rise. During the initial portion of the first stage, the butadiene polymerizes much more rapidly than the styrene, so that little of the latter initially copolymerizes. Temperature rises can be correlated with this partial conversion of butadiene by mere routine test in any particular case so that the optimum temperature increase for addition of the randomizer is readily determinable. Alternatively, the desired temperature rise can be calculated by methods and concepts well known in the art. The production of random copolymer block then proceeds in the second stage.

In an advantageous embodiment of my invention, the second stage of polymerization can be begun at a predetermined time interval after attainment of a preselected temperature increase in the reaction zone. The advantage of this method of operation will be apparent when one considers that the temperature begins to rise very rapidly when the polymerization begins, but the rate of temperature rise decreases after a time and the temperature tends to level off. Frequently, it is desired to continue the first stage for a time after the temperature has begun to level off. Further rise in temperature during this interval is likely to be rather small so that a problem of instrument sensitivity develops. It is therefore desirable to detect the attainment of a given temperature rise and to begin the second stage at a predetermined time interval following the time at which the rate of temperature rise has significanty abated.

In another embodiment of my invention, I provide advantageous control apparatus for a reaction of the type described. This control apparatus comprises, in combination with adiabatic reactor means together with means for supplying a first and second comonomer to said reactor means, the improvement comprising means for generating a first signal proportional to temperature rise in said reactor means, means for generating a second signal which is responsive to elapsed time subsequent to attainment of a predetermined magnitude by said first signal, and means for actuating, in response to said second signal, the means for supplying at least one of said comonomers to said reactor. Thus the apparatus can comprise an adiabatic (heat insulated) autoclave having a plurlity of supply conduits, a valve in each supply conduit, means for generating a first signal on attainment of a preselected temperature rise in said autoclave, timing means for generating a second signal at a preselected time subsequent to said first signal, and means for actuating at least one of said valves in response to said second signal.

The alkadienes used in the process of my invention are generally those having from 4 to 6 carbon atoms per molecule. These include 1,3-butadiene, 1,3-pentadiene, 1,3-hexadiene, and isoprene. 1,3-butadiene is most frequently used on account of its commercial availability.

The vinyl aromatic compounds utilized in my invention are generally those having from 8 to 20 carbon atoms per molecule. Examples of these include styrene, methylstyrene and the vinylnaphthalenes. Styrene is most frequently used, again because of its commercial availability.

The randomizing agents used in certain embodiments of my invention are those set forth in United States Patent 2,975,160 (1961) and need not be enumerated in detail here. The agent most frequently used is tetrahydrofuran. The randomizing agent is generally used in minor proportions with respect to the hydrocarbon diluent. Generally, the reaction medium comprises a major proportion of a liquid hydrocarbon and a minor proportion of the randomizing agent. Frequently, the amount of radomizing agent used in the reaction medium is from about 0.01 to about 5 weight percent, based on randomizing agent plus hydrocarbon diluent.

The hydrocarbon diluent or reaction medium is chosen from those utilized in the prior art cited herein. It is generally a liquid hydrocarbon which is inert under the reaction conditions and is selected from the group consisting of paraffinic, aromatic and cycloparaffinic hydrocarbons. Specific examples are n-hexane, cyclohexane, benzene, toluene, the xylenes, methylcyclopentane, and the various octanes.

The terms, "organolithium catalysts" and "organolithium polymerization catalysts" used herein signify compounds represented by the formula $RLi_x$ wherein R is an alkyl, a cycloalkyl or an aryl hydrocarbon radical having from 3 to 20 carbon atoms and $x$ is an integer in the range 1 to 4. These compounds are well known in the prior art and are more specifically described in the United States yatent hereinbefore cited. Specific examples include n-butyllithium, n-amyllithium, n-hexyllithium, phenyllithium and naphthyllithiums. The amount of catalyst used generally ranges from about 0.01 to about 10 parts by weight per hundred parts by weight of total comonomers. However, amounts outside this range are operative.

Both stages of the copolymerization reaction are frequently conducted within the range 100 to 300° F., although temperatures outside these ranges are operative.

The pressure maintained during the reaction is usually of sufficient magnitude to maintain the reaction mixture essentially in the liquid phase. These pressures are of the order of magnitude of 100 to 500 p.s.i.a. The reaction times involved in each stage can vary within rather broad limits but generally range from 15 minutes to 24 hours depending upon the specific type of polymer desired.

In preselecting the temperature rise which serves as the control criterion in accordance with our invention, the specific temperature at which the second stage of reaction is begun will depend upon the specific apparatus, the specific reactants and the specific reaction design in question. The temperature rise can readily be correlated with percentage conversion by mere routine test or by theoretical calculations from rate of heat release, specific heat of reactor contents and rate of heat exchange with the reactor's surroundings so that a chosen value for any particular reaction and reactor can readily be determined.

A specific embodiment of my invention is here described with reference to the accompanying drawing. As shown in the drawing, n-hexane from a source 2 passes through a conduit 3 into reactor 4, which can be an autoclave provided with a suitable stirrer, 1,3-butadiene from a source 5 passes through conduit 6 into reactor 4. Styrene is supplied from a source 7 through conduit 8 into reactor 4. Normal butyllithium from a source 9 is supplied through conduit 10 into reactor 4. Divinylbenzene from a source 12 can be supplied to reactor 4 through conduit 13 during that stage of the reaction in which the homopolymerization of butadiene occurs. The divinylbenzene is usually supplied in the amount of a few percent or less based on the amount of butadiene polymerized and serves to decrease the tendency of the polymer to cold flow.

The reaction is begun by supplying n-hexane to reactor 4 as described. At the same time, n-butyllithium is supplied to the reactor. During the first stage of the reaction approximately 500 parts by weight of hexane and 82.5 parts by weight of butadiene from source 5 are supplied toreactor 4. Approximately 0.2 part by weight of divinylbenzene per hundred parts by weight of butadiene is also supplied. The amount of n-butyllithium supplied is approximately 0.5 part by weight per hundred parts by weight of butadiene. The reaction is conducted in its first stage as a batch reaction. Reaction is initiated at approximately 100° F. After reaction begins, the temperature rises rapidly to approximately 185° F., which is detected by thermocouple 14, which produces a corresponding voltage in temperature detector 15. Detector 15 can include an amplifying circuit. A a preselected voltage, corresponding to a temperature of 185° F., and produced in detector 15 by thermocouple 14, detector 15 actuates timing device 16 which can be a clockwork mechanism connected to an additional electric circuit to close such circuit after a preset time interval. This interval is previously determined to correspond to conversion of about 30 parts by weight of the butadiene charged. When this interval has elapsed, the timing device closes the second-mentioned circuit which then actuates a source of instrument air not shown. The (compressed) air then opens diaphragm motor valves 28 and 19, thus beginning the second stage of reaction. Thus there is supplied 17.5 parts by weight of sytrene to the eractor from source 7 through conduit 8 together with approximately 5 parts by weight of tetrahydrofuran from source 11 through conduits 12, this percentage being based on total weight of tetrahydrofuran plus n-hexane. The second stage of reaction then produces a random copolymer block by copolymerization of the styrene with unreacted butadiene in the autoclave.

After a suitable residence time, the valve in conduit 20 is opened and the reactor contents, joined by a short-stopping agent from source 21, pass into recovery zone 23, which can be conventional recovery equipment well known in the synthetic rubber art. Product polymer is recovered through conduit 24. Normal hexane is recovered through conduit 25, and tetrahydrofuran through conduit 28, for reuse. Any unreacted butadiene and styrene are recovered through conduits 26 and 27, respectively. The product copolymer contains a homopolymer segment formed by polymerization of 30 parts by weight of butadiene, and a copolymer segment formed by 52.5 parts by weight of butadiene and 17.5 parts by weight of styrene units distributed at random along the main carbon chain.

If desired, in the embodiment just described, control units 14, 15, 16 and motor valve 18 can be so adjusted that motor valve 18 is closed at the time motor valves 19 and 28 are opened so that the divinylbenzene is not utilized in the random copolymer stage.

In a second specific embodiment of my invention 600 parts by weight of n-hexane, 75 parts by weight of butadiene, 25 parts by weight of styrene, 1.77 parts by weight of tetrahydrofuran, 0.047 part by weight of divinylbenzene and 0.065 part by weight of n-butyllithium are supplied to reactor 4 from the various sources shown in the first stage, which is initiated at 100° F. After the reaction temperature has risen to 197° F., temperature detector 15, having been set to function at this temperature in response to voltage generated by thermocouple 14, actuates timer 16 which closes an electric circuit 20 minutes after the temperature of 197° F. has been reached. This circuit then actuates a source of instrument air, which, in turn, actuates motor valve 17 supplying 17.7 additional parts by weight of butadiene from source 5 through conduit 6. The reaction is then continued to substantial completion. The reactor contents are then shortstopped with approximately two parts by weight of a fatty acid and stabilized with 1 part by weight of 2,6-dimethyl-4-tert-butylphenol per hundred parts by weight of polymer. The polymer was recovered from solution by steam stripping to volatilize the hexane. The polymer had a Mooney (ML-4) viscosity of 50. Infrared analysis indicated that the polymer was made up of a copolymer block containing 63.7 parts by weight of butadiene and 21.3 parts by weight of styrene; and a homopolymer block containing 15 parts by weight of butadiene units.

Product polymer was compounded to form a tread stock in accordance with the following recipe, in which the numbers indicate parts by weight:

| | |
|---|---|
| Polymer | 100 |
| HAF carbon black | 50 |
| Zinc oxide | 3 |
| Stearic acid | 2 |
| Flexamine [1] | 1 |
| Aromatic extender oil | 10 |
| Sulfur | 1.75 |
| Santocure [2] | 1 |

[1] Mixture 65 wt. percent reaction product of a diarylamine and a ketone +35 wt. percent N,N'-diphenyl-p-phenylenediamine.
[2] N-cyclohexyl-2-benzothiazyl sulfenamide.

The recipe was cured for 30 minutes at 307° F. The following properties were determined:

| | |
|---|---|
| Compression set, percent (ASTM D-395-61) | 27.6 |
| 300 percent modulus, p.s.i. (ASTM D-412-61T) | 1390 |
| 400 percent modulus, p.s.i. (ASTM D-412-61T) | 2025 |
| Tensile strength, p.s.i. (ASTM D-412-61T) | 3160 |
| Elongation, percent (ASTM D-412-61T) | 590 |
| Crescent tear, lb./in. (ASTM D-624-54) | 195 |

The foregoing data show that the polymer produced in accordance with my invention had satisfactory properties for the production of a tire-tread stock.

While my invention has been described in connection with specific embodiments, it is not limited thereto. As will be recognized by those skilled in the art, temperature detector 15 can be either a detector of a particular temperature (as previously described herein) when the reaction is always begun at a specified temperature, or it can be a detector which records a variable initial temperature and produces a signal at a predetermined temperature interval above said initial temperature. Furthermore, the divinyl benzene and the tetrahydrofuran can be charged through metering devices adjustable to supply a definite predetermined amount of each material. Instruments 14, 15, 16, 17, 18, 19, and 28 are all of types well known in the art and are not individually, per se, the substance of this invention.

I claim:

1. In a process for producing a block copolymer of an alkadiene monomer and a vinyl aromatic hydrocarbon monomer by polymerizing at least one of the monomers in a first stage followed by the polymerization of at least one of the monomers in a second stage, the improvement which comprises automatically controlling said process by sensing the temperature rise in said first stage, producing a signal proportional to the sensed temperature rise, and beginning said second stage after said signal has reached a predetermined value.

2. The process of claim 1 wherein 1,3-butadiene is said alkadiene and styrene is said vinyl aromatic compound.

3. A process according to claim 2 wherein a second signal representative of time elapsed subsequent to the attainment of said predetermined value is produced and said second stage is begun in response to said second signal.

4. In a process for producing a block copolymer by homopolymerizing 1,3-butadiene in a first stage to form a homopolymer block and copolymerizing 1,3-butadiene with styrene in a second stage to form a copolymer block, the polymerization in both stages being promoted with an organolithium polymerization catalyst, the improvement which comprises automatically controlling said process by charging 1,3-butadiene to the polymerization reactor and conducting said first stage adiabatically, producing a signal proportional to the temperature in said first stage, and beginning said second stage by charging styrene to the polymerization reactor, said charging being in response to the attainment, by said signal, of a predetermined magnitude.

5. A process according to claim 4 wherein a second signal representative of time elapsed subsequent to said attainment, by the temperature signal, of said predetermined magnitude, is produced, and beginning said second stage in response to said second signal.

6. In a process for producing a block copolymer of butadiene and styrene, the improvement which comprises automatically controlling said process by charging a major proportion of butadiene and a minor proportion of styrene to a polymerization zone, charging also to said zone a liquid hydrocarbon diluent and an organolithium polymerization catalyst, initiating polymerization reaction, maintaining said polymerization reaction under substantially adiabatic conditions, detecting the temperature rise in said polymerization zone, producing a signal proportional to the detected temperature rise, and charging a minor proportion, based on the amount of said hydrocarbon diluent present, of a randomizing agent in response to said signal corresponding to partial conversion of said butadiene, and continuing polymerization in the presence of said randomizing agent.

7. A process according to claim 6 wherein said randomizing agent is tetrahydrofuran, and is supplied to said polymerization zone at a predetermined time subsequent to said attainment by said signal of said preselected value.

References Cited
UNITED STATES PATENTS

| | | | |
|---|---|---|---|
| 2,886,616 | 5/1959 | Mertz et al. | 23—253 |
| 3,087,917 | 4/1963 | Scoggin | 260—88.2 |
| 3,234,409 | 2/1966 | March et al. | 307—141 |
| 3,251,905 | 5/1966 | Zelinski | 260—879 |

SAMUEL H. BLECH, *Primary Examiner.*

C. J. SECCURO, *Assistant Examiner.*

U.S. Cl. X.R.

23—230, 253, 285; 260—95